United States Patent Office 3,142,625
Patented July 28, 1964

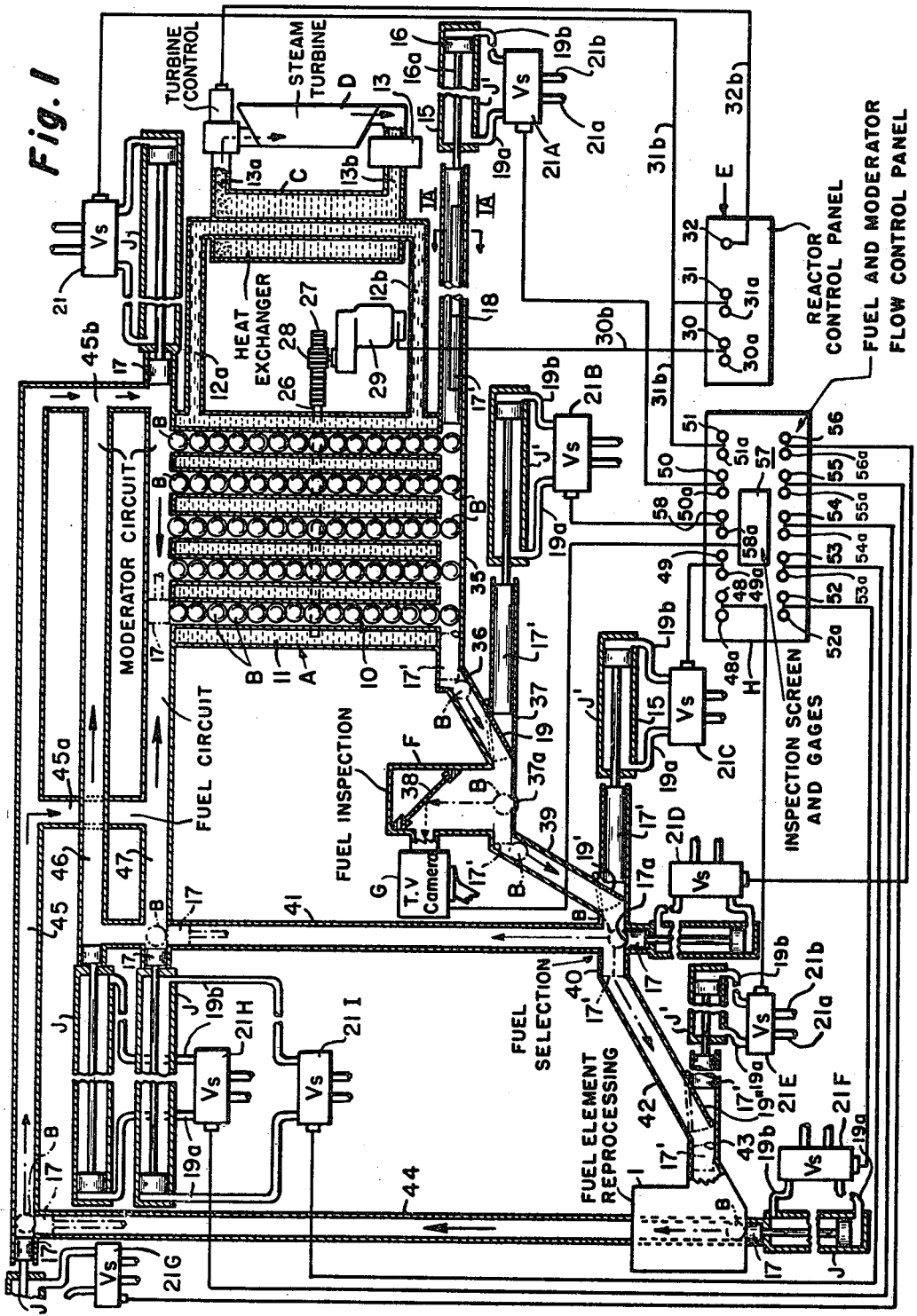

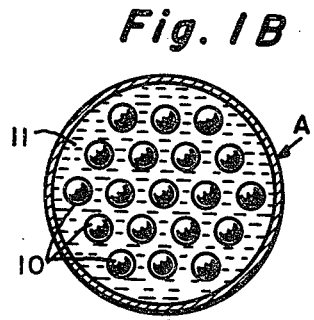
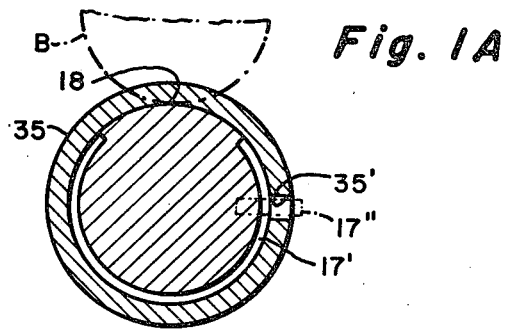
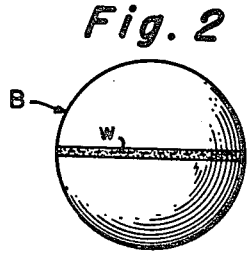
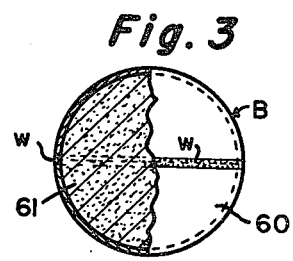
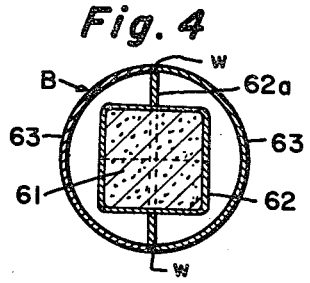
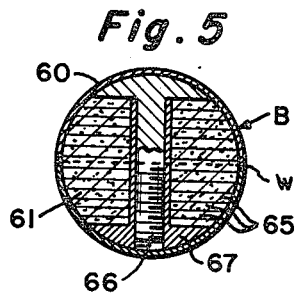
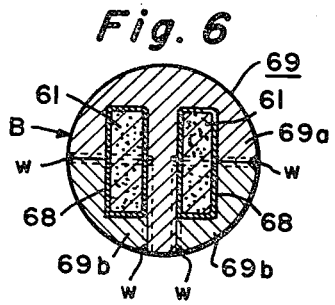
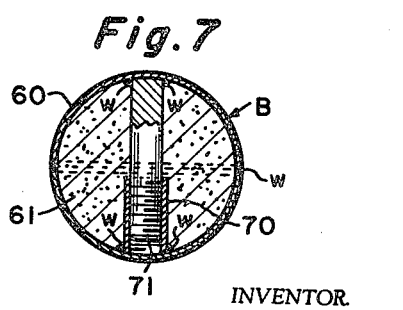
INVENTOR.
William W. Wellborn

3,142,625
NUCLEAR REACTOR PLANT WITH INSPECTION AND REPROCESSING STATIONS
William W. Wellborn, Bloomfield Hills, Mich., assignor to Firth Sterling, Inc., Pittsburgh, Pa., a corporation of Pennsylvania
Original application June 15, 1956, Ser. No. 591,726. Divided and this application Dec. 7, 1959, Ser. No. 857,825
2 Claims. (Cl. 176—32)

This invention relates to the construction and operation of a nuclear reactor and particularly, to fuel and control elements therefor. This is a divisional application of my parent application Serial No. 591,726, filed June 15, 1956 and entitled "Nuclear Reactor."

An important phase of my invention deals with the provision of reactor, control or moderator elements that may be effectively moved, inspected, by-passed, removed, and replaced with respect to the reactor unit without shutting down the operation of the latter. This invention thus relates to the problem involved in using, inspecting, replacing, and controlling the use of conventional types of reactor elements. Heretofore, fissionable materials have, as a general practice, been provided in the form of rods of rectangular shape. Although the plates may have a relatively long period of life, experience has taught that some of them will be used up at a faster rate than others or may become damaged in some way, as by distortion due to excessive heat, so that they have to be sooner removed and repaired or replaced. To effect the latter operation, it has been heretofore necessary to shut down the system, to lower a heavy protective lead shield, and with the shield in place over them, to lift the plates and shield away from the reactor unit.

Although in a homogeneous reactor, it is possible to employ a uranium compound or solution that is pumped through a system, such an arrangement is not entirely satisfactory, among other reasons, due to the extremely high corrosive action of the solution or compound on pipe members of the system. Thus, if the system is to have any effective life at all, highly expensive metals or alloys must be employed and even then, the life period for the metals is too short to make the system practical as a commercial installation and as one having a reasonable period of operating life.

It will be recognized that the basic difficulty in handling elements of a reactor unit rests in their high radioactivity and the danger of contaminating other substances and particularly, the danger from the standpoint of the operating personnel as to the possibility of a lethal dose of gamma rays. As nuclear reactors are now coming into use for everyday power requirements, as distinguished from military requirements, items of cost of the installation, cost of operation, and danger to personnel, etc., attain increasing importance. That is, the present-day need is for a nuclear unit or system which may be operated on a continuous, long-time basis without the necessity of shutting-down periodically for replacing reactor plates, for changing the relationship between moderator or control rods or bars and the reactor plates, etc.

It has thus been an object of my invention to provide a nuclear energy-utilizing system which will make possible a controlled flow therethrough of individual bodies of charging material in the nature of fissionable reactor (fuel) or moderator (reaction regulating) element unit masses in the form of fully sealed-off balls or spheres that fully enclose the masses with a unitary housing or casing and will make possible a desired arrangement or rearrangement of such element masses in a nuclear reactor unit, all without interrupting the operation of the system.

Another object has been to devise a simple and practical method of inspecting the elements before they are removed from the system and then selectively handling them so as to remove those that need to be reprocessed or replaced without upsetting the operation of the system or the nuclear reactor unit, itself.

Another object of my invention has been to eliminate the disadvantageous features of a conventional layout as well as of the homogeneous system and, in effect, provide the advantages of both without their individual disadvantageous features.

A further object of my invention has been to devise a new form, shape or type of reactor or control element, such that the elements will operate effectively in a reactor and may, from time to time, be removed from the reactor, inspected by remote control, the period of further effective life noted and then, returned to the reactor unit or if their effective life has expired, I may introduce replacement elements, all without disturbing the operation of the reactor and by remotely handling the materials without danger to operating personnel.

A still further object has been to devise a spherical or rounded type of element which will be effective in a circulating system, and which will operate efficiently in a reactor unit.

These and many other objects of my invention will appear to those skilled in the art from the drawings and the description attendant therewith.

In the drawings, FIGURE 1 is a somewhat diagrammatic layout illustrating a system constructed in accordance with my invention and utilizing the principles of my invention; in this figure, spherical, roller or ball-like elements are employed as stacked columns in a reactor unit, means are provided for selectively moving the ball elements through the system and for moving reprocessed or replacement balls to the top of the unit without the necessity for stopping a power-generating reaction:

FIGURE 1A is an enlarged sectional detail showing the construction of pusher units, as push-button controlled, to move, flow or pass spherical elements along the system of FIGURE 1;

FIGURE 1B is a reduced horizontal section taken through a reactor such as shown in FIGURE 1;

FIGURE 2 is an enlarged view in elevation illustrating the general outer shape of rounded or spherical forms of elements constructed in accordance with my invention;

FIGURE 3 is a partial section in elevation on the scale of FIGURE 2 and showing the employment of granulated materials in a metal enclosure or shell;

FIGURE 4 is a vertical section on the scale of FIGURE 2, showing a form of element in which reactor material is enclosed in a rectangular or cube-like enclosure which is, in turn, provided with fins that are secured to the inside of a spherical metal enclosure;

FIGURE 5 is a vertical section on the scale of FIGURES 2 and 3, illustrating another form of element constructed in accordance with my invention wherein a series of thin wafers or layers of reactor material are stacked, are enclosed within a thin metal housing or cover, and are held together within the cover by a beveled pin or bolt and nut assembly;

FIGURE 6 is a vertical section on the scale of FIGURES 3 and 4, showing a further form of element constructed in accordance with my invention and wherein a pair of spaced-apart, parallel reactor material rectangular bar pieces or rods may be positioned and assembled in segmental portions of a sphere that provide a supporting and enclosing roller surface or housing;

And FIGURE 7 is a vertical section on the scale of FIGURES 3 to 6, showing a further type of element wherein a pair of hemispheres are filled with the material and secured together by a set screw. The latter extends axially through the spherical assembly and cooperates with a thin, inner, axially-extending, internally-threaded, tubular wall or sleeve portion.

In accordance with my invention, I place nuclear reactors on a practical production basis for continuous power generation and greatly simplify charging, positioning, inspection, handling, discharging, replacement, and repair of fuel and control elements that are to be used within the reactor unit.

The Ball Elements

Each element or charging body B has a spherical, rounded or ball-like outer casing, housing or surface enclosure of a suitable material, such as stainless steel, aluminum or zirconium. These metals have found rather extensive use for nuclear applications, due to their satisfactory mechanical properties, relatively good nuclear economy, extremely low neutron cross-section (does not readily absorb neutrons), and good corrosion resistance. Other metals that may be used for this purpose are beryllium, molybdenum, nickel, and titanium.

In general, I prefer to provide the fuel in relatively thin portions or sections, such as in the form of thin wafers, as illustrated in the construction of FIGURE 5, or in the form of relatively thin packs, as illustrated in FIGURE 6. However, a conventional shape of fuel element in the form of a cube, but provided with metal fins on its outside may also be employed, as illustrated in FIGURE 4 of the drawings. Also, as illustrated in FIGURES 3 and 7, spherical or rounded masses, compacts or fillers may be used. The balls or spheres B may run from about half an inch to about six inches in diameter, but the principle involved is the same.

With particular reference to FIGURES 2 to 7, inclusive, I contemplate carrying the nuclear or other materials within an element B that has an outer facing, surface or shell of one of the above-mentioned suitable metals. A typical element B is shown in FIGURE 2 which is made up of at least two parts, halves or spheres secured together by a fillet weld $w$. The weld is smoothed-off (as by grinding or machining) to provide a substantially uniform curvature of the surface.

In the embodiment of FIGURE 3, I employ a relatively thin outer metal shell 60 which is made up of a pair of halves and which contains the control or nuclear material 61 as a particle or granular mass, core body or compact therein. In this manner, the material 61 is completely sealed-off and enclosed within the metal shell 60.

In the embodiment of FIGURE 4, the material 61 is enclosed in a cube shape, a square or a rectangular inner, relatively thin metal enclosure wall 62 and is secured to a facing or outside shell 63 by at least a pair of opposed metal web or rib portions 62$a$. To simplify the mounting, I have shown the weld or brazing metal seam $w$ as falling at the point of contact of the fin or web portions 62$a$, so that the two halves of the rounded enclosure or sphere 63 may be simultaneously secured together with securing of the assembly 62 in position. For this purpose, butt welds $w$ are shown.

In the embodiment of FIGURE 5, metal shell 60 which is made up in the same manner as the shell of FIGURE 3, carries a pair of demountable and adjustable, male and female, clamping parts 66 and 67. As shown, the part 66 has a centrally-located and extending threaded stub or pin and the part 67 has an internally-threaded sleeve to receive the stub of the other part. The material 61 is in the form of relatively thin wafers or compacts 65 which are positioned in an aligned or stacked relationship with each other on the sleeve portion of the part 67. The compacts 65 are clamped in position by rotating or screwing-down the part 66 with respect to the part 67. When this operation is completed, the enclosing shell 60 may then be secured in position as by a fillet weld $w$. Although the metal of the parts 66 and 67 may be of the same type as the shell 60, any suitable metal may be employed which will serve the assembling and clamping function and which, if desired, may have an additional function as to the operation of the material 61 of the element.

In FIGURE 6, the element B is made up of interfitting or complementary segments, such as 69$a$ and 69$b$. As shown, these segments define a pair of rectangular cavities to receive relatively thin packs 68. The packs contain the material 61 as a core mass. The member 68 may be of suitable metal, such as of aluminum or zirconium foil. In assembling the construction, the packs 68 may be inserted within the cavities of the substantial half portion or segment 69$a$ and then the substantial quarter portions or segments 69$b$ may be moved into position and secured together by fillet welds $w$.

In the embodiment of FIGURE 7, one half of a spherical shell 60 carries a threaded screw or stub 71 and the other half carries an internally-threaded sleeve or cylinder 70. In assembling this construction, the halves are filled with the material 61 and the parts 70 and 71 are then screwed or tightened down until the edges of the halves 60 engage. At this time, a fillet weld $w$ may be provided.

The System

The elements B are moved in a remotely-controlled manner from the standpoint of the operator by suitable controls (such as the electrical-fluid controls illustrated) and movement-producing mechanisms. Movement induced by rolling the elements downwardly by gravity is also included. Nuclear reaction-limiting, regulating or moderator elements or charging bodies of the same round shape may be introduced or removed, as desired, but normally are positioned in a separate one of channels 10 to absorb neutrons and act as brakes. However, in accordance with my invention, they may be used in the same column or channel as the reactor elements. Also, I have illustrated how a control or moderator rod or bar 26 may be used.

Referring particularly to FIGURE 1 of the drawings, A constitutes a nuclear reactor or energy-producing source unit, and B represents the elements (reactor, moderator or control) that are maintained or positioned in a series of stacked columns between cooling fluid or liquid-jacketed walls 11 thereof. The walls 11 may be also of a suitable metal such as zirconium or aluminum. Heat energy thus imparted to fluid within the jacketing 11 flows in a continuous manner from the top of the unit A along a channel or conduit 12$a$ in a continuous circuit through a heat exchanger C, and then back by a lower return channel or conduit 12$b$ to the reactor A. The fluid or liquid employed in the closed, heat energy transfer system may be and preferably is molten sodium metal, although bismuth, liquid lead and other suitable materials may be used. Although not shown, circulating pumps may be used in the system.

Heat energy introduced to the exchanger C may then be imparted to a suitable fluid, such as water, and carried as superheated steam by an overhead or upper conduit 13$a$ into a representative energy utilizing unit, such as a steam turbine D. The cooled steam and condensate then returns back by lower conduit 13$b$ to the exchanger C.

A control rod or a series of rods or bars of a suitable conventional material or materials 26 may be employed to supplement or control the reaction and its speed. As shown, each rod 26 may have a rack 27 at its outer end, so that it may be moved inwardly and outwardly by a reversible electric motor and gear reduction until 29, through driving gear 28. It will be noted that the driving gear 28 meshes with the rack 27. The unit 29 is shown controlled by an electric cable 30$b$ that leads to a two-part push-button switch means 30 and 30$a$ on a control board or panel E. The panel E is shown provided for controlling the operation of the reactor unit A and the turbine D. In this connection, push-button control means 31 and 31$a$ operates solenoids of a conventional three-way valve $V_s$ and a pusher unit J of an upper (right-hand) operating assembly 21 through cable 31b. This pusher unit is employed to add additional elements B to the top of the vertical columns 10 within the reactor unit A. Push-button switch 32 is connected through cable 32b to energize and de-energize a conventional solenoid control for the steam turbine D. It will be noted that operating assemblies 21 and 21A to 21I are of similar construction, each employing a solenoid operated three-way valve $V_s$ and a pusher unit J or J', but that each operating assembly is positioned at different locations in the system.

Beyond the reactor A, I have provided an inspection station F at which each element B may be inspected as it is selectively presented thereto. The means shown is remote viewing means, such as a television camera G. If the element still has a useful period of life, the amount is then noted and the element may then be return-routed through the system back towards the reactor A. This may be visually determined by one skilled in the art from the standpoint of whether or not the element is corroded or is slightly distorted as to its shape. It is well known that fissionable uranium materials, such as $U^{233}$, $U^{235}$, or $U^{239}$, tend to swell as they are used up. Although this swelling is slight in an element (spherical) of the type here involved, it is easy to note visually with the attendant corrosion. Moderator elements may be used somewhat indefinitely. If the element has no useful period of life, it may be sent to a fuel reprocessing station I which is a special station that may be work-accessible to the operator, but is suitably shielded to protect him. A fuel and moderator element flow panel H controls the operation of the system, particularly outwardly from and to the left of the reactor unit A in FIGURE 1.

It will be noted that I make use of gravity movement of the balls or spheres B, but at the same time, provide means for inducing horizontal as well as vertical movement in an active manner against the force of gravity in fluid-piston-actuated, reciprocating pusher units J and J'. It may be noted that the units J' are the same as units J, except that (as shown in FIGURES 1 and 1A) the pusher head 17 of each of the units J has a solid, short-length, cylindrical shape and the head 17' of each unit J' is formed from a relatively longer-length cylindrical shape, such as a rod or round bar that is machined-away or relieved at the center to lessen friction. This is done in such a manner as to leave a connecting rib or pair of ribs 18 of rounded or curved section. At least one portion 18 extends along the upper reaches of the longitudinal spacing between solid forward and rearward portions of the pusher 17'.

As shown particularly in FIGURE 1A, each unit J or J' is a fluid-motor type that may be operated by a pneumatic or hydraulic fluid. A cylindrical housing or enclosure 15 serves to operatively house a piston 16 and its forwardly-projecting piston rod 16a (see the right central unit J' of FIGURE 1). The forward end of the casing 15 is slotted to by-pass the rod 16a and, in the case of the units J', to also by-pass the rib part 18. A suitable form of sealing-packing construction may be used.

The projecting end of the rod 16a carries the pusher head 17 or 17' that is adapted to move along and within an associated tubing or conduit of the system to thus move, actuate or cause a flow of the spherical or ball elements B. The housing 15 has ports 19a and 19b at its opposite ends or, in other words, at its front and back ends to supply and exhaust the motivating fluid (see also the right central unit J' of FIGURE 1). The port 19a alternately serves as an exhaust and inlet port, as does the port 19b. In this connection, with the piston head 16 in the position of FIGURE 1, the port 19b may be connected to serve as an inlet port and the port 19a connected to serve as an outlet port.

Electrical solenoid-operated valve unit $V_s$ is connected at one end to an exhaust or outlet line 21a and to an inlet line 21b of a suitable source of fluid energy. The solenoid control $V_s$ may be of any commercial type, and is shown controlled by a pair of electrical push-buttons, such as 31 and 31a on panel E, and 48 and 48a to 56 and 56a on panel H to alternately move the solenoid valve unit $V_s$ to connect the fluid motor ports 19a and 19b to the lines 21a and 21b for forward and reverse movements of the piston 16.

A spring normally urges the valve of unit $V_s$ to close off fluid flow as to the ports 19a and 19b, while one of an opposed pair of solenoids will move the valve to connect 19a to 21a and 19b to 21b, and the other solenoid will move the valve to connect 19a to 21b and 19b to 21a. The straight numerals (such as 48) are employed to indicate the switch for the first-mentioned solenoid and the numerals with subaffixes (such as 48a) are employed to indicate the switch for the second solenoid.

The valve unit $V_s$ is de-energized by the same switches to cut-off any flow at all as to the ports 19a and 19b. In this manner, the pusher head 17 or 17' may be stopped at any desired position and left at that position until additional movement is desired. When one of the push-buttons 48, etc., is pushed in, it will either energize its solenoid to cause a forward advancing movement of the piston 16 of the unit J or J' or, if it has already been energized, will de-energize the unit and stop the piston at a desired location.

In like manner, energization of the push-buttons 48a, etc., will move the piston 16 backwardly and until it is stopped by again pushing the same button. It will be noted that push buttons 30 and 30a, 31 and 31a, 48 and 48a, 49 and 49a, 50 and 50a, 51 and 51a, 52 and 52a, 53 and 53a, 54 and 54a, 55 and 55a, and 56 and 56a, all operate in the same manner as to the respective pusher units J or J' to which they are operatively connected from panels E and H.

In the flow system of FIGURE 1, a tubular, forwardly-horizontally-extending channel, passageway or conduit 35 extends along beneath the unit A to, at its right (front) end, receive the pusher head 17' of one of the units J' (see operating assembly 21A) and, at its left (back) end, is connected to a downwardly-declining drop conduit 36. The conduit 36 is in turn connected to a backwardly-projecting, horizontally-extending passageway or conduit 37. The conduit 37 is also provided with a forward pusher unit J' of operating assembly 21B and has a slight seating depression 37a in its forward end portion to align the elements B with a mirror 38 of the inspection unit F, so that a properly reflected image may be directed from mirror 38 to a viewing means, such as the camera G.

The lower end of each of the inclined conduits 36, 39 and 42 is shown provided with a hinged drop flap or swing door of similar construction, respectively designated as 19, 19' and 19'', that falls down to its full line position when the pusher head 17' of operating assembly 21B, 21C or 21E is withdrawn backwardly to permit an element B to fall. The flap 19, 19' or 19'' is pushed up to its dot and dash line, closed, upper position to prevent the fall of an element B when the head 17' of operating assembly 21B, 21C or 21E moves forwardly beneath it.

In the conduit 37, the elements B are progressively and individually moved into a forwardly-declining drop-conduit or passageway 39 and into a horizontally-projecting, lower-level, tubular passageway or conduit 40. A pusher unit J' of operating assembly 21C moves an element B that has been rejected at F down at forwardly-declining tubular drop conduit or passageway 42, into a lower-level, projecting horizontal passageway or conduit 43. A pusher 17' of operating assembly 21E is adapted to assure movement of the element B from conduit or passageway 43 into reprocessing unit I.

If an element B is selected for further usage at F, it is moved to a seat provided by a slight concavity 17a of a vertically-positioned pusher head 17 of a unit J of operating assembly 21D (below conduit 40) and is then moved upwardly along vertical return passageway or conduit 41 to the level of one of a series of upper, horizontally-disposed, tubular passageways or upper level conduits 46 or 47. The element B may be moved by an upper pusher unit J of operating assembly 21H along conduit 46 to a vertical drop conduit 45b, into lower cross conduit 47, and then into one of the column openings 10 by means of a righthand pusher J of operating assembly 21 that is controlled by push-buttons 30, 30a of panel E, and alternatively, by buttons 51 and 51a of the panel H. If the element B being returned is carried only to the level of the lower conduit 47 of the two, then pusher J of operating assembly 21I may directly move the element to the right of FIGURE 1 into one of the openings of the column 10.

It will be noted that the pushers 17 of the right and left-hand units J of operating assemblies 21 and 21I that operate in the channel or conduit 47 may cooperate with each other by being simultaneously moved in opposite directions, but in a spaced relationship with each other that corresponds to the diameter of an element B, such that the element may be accurately positioned in any desired one of the channel openings 10 of the reactor unit A.

New or re-processed elements B may be individually lifted or pushed by a vertically-disposed pusher unit J of operating assembly 21F, along a vertical up-flow tubular conduit or passageway 44 into a top cross-flow horizontal tubular conduit or passageway 45. A left-hand-positioned unit J of operating assembly 21G in the conduit 45 may then move the element to the right to drop it down one of two tubular, vertically-positioned, drop channels, passageways or conduits 45a or 45b. In this way, the elements B are placed in the lower channel 47 for selective introduction into the reactor unit A.

It is contemplated that the reaction unit or apparatus A will be provided, as shown, with a group or series of vertical columns 10 therealong which have a horizontally spaced-apart relationship with each other. These columns 10 may also, as shown, be open at their upper and lower ends to respectively provide inlets and outlets for the selective flow or rolling movement of the elements B.

In employing the system of my invention, the elements B may be entirely of a type providing fissionable material for the nuclear reaction, although it is contemplated that they may also be of a type providing diluent and moderator materials. In any event, the principle of induced movement is the same as to the elements B, regardless of the nature of their content. However, if control elements, for example, are used, they will, of course, be suitably interspersed with fissionable elements to promote and maintain a desired type of chain reaction. In this connection, as previously indicated, they may be alternated within the individual columns 10 or one or more of the columns may be individually employed to contain only moderator or control materials.

It is well recognized that suitable moderator materials are needed to slow-down high fission velocities and promote neutron absorption with a resultant continuous chain reaction. A good moderator must not only have a low atomic weight, but also a low neutron ratio or cross section. Thus, heavy water, graphite, and beryllium are the most commonly used materials. Although the coolant fluid-jacketing of the unit A may in some cases be accomplished by water, I prefer molten sodium metal or a molten sodium-potassium alloy metal.

By eliminating the customary use of slugs, plates and rods of fissionable material, I have been able to provide what effectively amounts to a homogeneous, closed-circuit, remotely controlled, element-flow-circulating, remotely-viewed, and foolproof system for providing a new continuity of maintenance of energy-generating action in a nuclear reactor. The circulation is effected from one flow level to a lower flow level by inclined or down-drop connections which utilize gravity or potential energy; is effected along substantial horizontal flow levels by substantially horizontally-aligned, remotely-controlled pusher units which thus employ kinetic energy in effecting movement; and is effected from lower to higher levels along lift connections by means of substantially vertically-positioned and remotely-controlled, kinetic-energy-utilizing pusher units.

A more important phase of my invention deals with the conception of and the provision of a practical "flow" form of fissionable and control element. It also deals with the conception of the practicability of and the construction of a closed-circuit flow or circulating system along which the spherical elements may be safely moved by a remote-control means, may be inspected from a remote position and, as a result thereof, rejected or returned to the reaction unit.

Also, as indicated by the rack-actuated control rod 26 of FIGURE 1 of the drawings, conventional methods of control of the nuclear reaction may be employed with the spherical fissionable element shapes of my invention. My invention further makes possible a very close control of the use of spherical control elements that are a part of my closed-circuit system.

In FIGURE 1A, I have shown a radially-outwardly projecting guide pin 17″ that is fixed or secured in a right-hand end portion of pusher 17′ and that slides in a longitudinal slot 35′. This prevents the plunger or pusher 17′ from rotating in a guide tube or conduit such as 35 of FIGURE 1. Such a guide and slot arrangement is unnecessary where a pusher 17 of full or solid diameter is used.

FIGURE 1B illustrates the preferred boiler type of arrangement of the tubes 10 of the reactor A. It may be noted that the tubes 10 may also, if desired, be positioned on a horizontal rather than a vertical plane, for example, by employing the reactor A on its side. In such a case, it would be necessary to push the balls B through the tubes 10. Neutronic reactor charging material, unless otherwise specified, refers to thermal neutron fissionable as well as moderator materials, such as are well known in this art, that are incorporated in my nuclear charging body of ball shape. Reaction material, unless otherwise specified, refers generally to fissionable material such as uranium reactor fuel, as is utilized in a nuclear reactor. Moderator material, unless otherwise specified, refers to nuclear reaction-limiting or neutron speed-adjusting, regulating or moderating material that is non-poisonous to reactor fuel, such as heavy water, graphite, or beryllium.

What I claim is:

1. In a closed nuclear power system employing a nuclear chain type of reaction and having a reactor provided with a group of horizontally spaced-apart open-end tubular stacking columns, the combination of a pair of tubular upper and lower main conduits, said upper main conduit being open at its bottom side to open upper ends of the stacking columns, said lower main conduit being open at its upper side to open bottom ends of the stacking columns, a plurality of spherical-shaped rolling metal-enclosed units containing nuclear fuel material and having means securely positioning the material therein, said units having a diameter smaller than the inner diameter of each of said columns and of said upper and lower main conduits for rolling movement along said conduits and within said columns; an inspection station, a selection station, and a reprocessing station for said rolling units; a first tubular connector conduit connected at one end to said lower main conduit and at its other end to said inspection station to receive individual rolling units from said lower main conduit and direct them to said inspection station, means at said inspection station for retaining an individual rolling unit thereat means for visually inspecting it at said inspection station so that its suitability for re-use may be determined, a second tubular connector conduit connected at one end to said inspection station and at its other end to said selector station for directing individual rolling units from said inspection station to said selector station, means at said selector station for positioning an individual rolling unit thereat, a third and return tubular connector conduit connected at one end to said selector station and at its other end to said upper main conduit for directing selected re-usable rolling units back into the open upper end of one of said stacking columns, a fourth tubular connector conduit connecting said selector station to said reprocessing station for directing selected rejected rolling units from said selector station to said reprocessing station, a fifth tubular connector conduit leading from said reprocessing station back to said upper main conduit for selectively directing reprocessed rolling units into an open upper end of any one of said stacking columns, said conduits and columns defining a closed system, and motor-actuated positive-acting pusher means operatively positioned for movement within said conduits to selectively and positively engage said rolling units and push and roll them therealong to and from the stacking columns and between said stations.

2. A nuclear power system which comprises, a reactor having at least one coolant-jacketed longitudinally extending open-end reactor conduit therein, a plurality of rolling spherical-shaped metal enclosure units containing nuclear fuel material therein, said units being operatively positioned in end-to-end series progression in said reactor conduit, reactor fuel unit inspection and reprocessing station, a conduit system connected to the open ends of said reactor conduit and defining a closed-circuit system of channels connecting said inspection and reprocessing stations in series progression and between the open ends of said reactor conduit, fluid-actuated mechanical pushers operatively positioned for movement within said channels into positive pushing engagement with said enclosure units to push and roll them within the conduit system, a control panel, motor means for advancing said pushers within said channels, and electric controls on said panel connected to operate said motor means to selectively advance said pushers into pushing engagement with said enclosure units and roll said units from one end of said reactor conduit to said inspection station, to said reprocessing station, and back into the other end of said reactor conduit.

References Cited in the file of this patent

UNITED STATES PATENTS

| | | |
|---|---|---|
| 2,849,387 | Brugmann | Aug. 26, 1958 |
| 2,890,158 | Ohlinger et al. | June 9, 1959 |
| 2,910,416 | Daniels | Oct. 27, 1959 |
| 3,058,897 | Slack et al. | Oct. 16, 1962 |
| 3,080,307 | Rinald | Mar. 5, 1963 |

FOREIGN PATENTS

| | | |
|---|---|---|
| 648,293 | Great Britain | Jan. 3, 1951 |

OTHER REFERENCES

Glasstone: "Principles of Nuclear Reactor Engineering," 1955, pp. 804–806, D. Van Nostrand Company, Inc., New York, N.Y.

Bellarts et al.: Nucleonics, vol. 14, No. 1, pages 30 to 33, January 1956.